April 25, 1933.                S. FUREDI                  1,905,846
                          PERPETUAL CALENDAR
                         Filed July 28, 1932         2 Sheets-Sheet 1
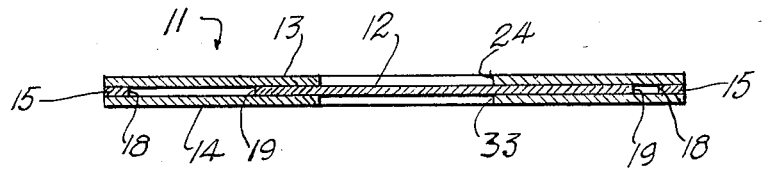

April 25, 1933.  S. FUREDI  1,905,846
PERPETUAL CALENDAR
Filed July 28, 1932  2 Sheets-Sheet 2

INVENTOR
Stephen Furedi
BY
ATTORNEY

Patented Apr. 25, 1933

1,905,846

UNITED STATES PATENT OFFICE

STEPHEN FUREDI, OF NEW YORK, N. Y.

PERPETUAL CALENDAR

Application filed July 28, 1932. Serial No. 625,266.

This invention relates to perpetual calendars, and has among its objects the provision of an improved compact device of this character which can be conveniently manipulated to obtain desired data, and which is inexpensive to manufacture and neat in appearance.

Another object of the invention is the provision of a perpetual calendar having a plurality of cards or members movable relatively to each other and data associated in an improved manner therewith so that a minimum number of numerals are needed for indicating dates in the ordinary and in leap years.

Another object of the invention is to furnish an improved perpetual calendar wherein an envelope member slidably encloses a date card for the days of the month, and the envelope having indicia coordinated with said card for indications with respect to ordinary and leap years.

Other objects and advantages of the invention will become apparent as the specification proceeds.

With the aforesaid and other objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a front plan view of a perpetual calendar embodying the invention.

Fig. 2 is a transverse sectional view thereof.

Fig. 3 is a front plan view of the insert.

Fig. 4 is a rear plan view of the perpetual calendar.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

Generally described, the invention provides a plurality of interrelatively movable members such as cards, one of said members having on one face thereof a tabulation of numbers for different months and years, and on its reverse side certain indicia which can be co-ordinated with indicia on a second member for indicating whether a particular year is a leap year and for causing the members to be so positioned with respect to each other that other indicia on the second member are correspondingly correlated with the tabulation of numerals on the first member to disclose the names of the days for the month and numerals of any desired year whether ordinary or leap year. Specifically, the first member may consist of an insert and the second member may be formed as an envelope for receiving the same. The envelope may have a front window for the months and a small opening for year marks on the insert, together with indicia for the names of months and days arranged for common and leap years. The back side of the envelope has a table for successive years, which table is reversed relative to the up and down direction of the front of the envelope, and said back side has an elongated transverse opening extending along said table, while the insert has numerals visible through said transverse opening for indicating where the insert shall be located so that the tabulation carried by said insert shall so register with said window as to afford a calendar for a corresponding year chosen on the table on the back of the envelope.

Referring in detail to the drawings, 10 denotes a device embodying the invention. The same may include a plurality of members 11 which are movable relatively to each other, and the former of which may consist of an envelope and the latter an insert 12 slidable in the envelope. Said envelope may have a front wall 13 and a coextensive rear wall 14 interconnected along their edges as by spacer strips 15 to facilitate easy sliding movement of the insert. The latter, and the envelope may be elongated so that the device has upper and lower edges 16, 17 respectively, and the insert is of substantially less width than the pocket 18 in the envelope so that the insert is movable toward the right or left until stopped by its longitudinal edges 19. The upper and lower edges 20 of the insert are slidable along the corresponding spacer strips 15 to maintain the insert square with the envelope.

The insert has a tabulation of numbers 21 including a plurality of vertical columns 21a that may be, for example, thirteen in number, as that has been found sufficient to illustrate the invention. The numbers in these columns are arranged in successive vertically arranged groups 22, the individual numerals of which follow an order so predetermined that the numerals of any seven successive columns shall correspond to those for the months of different years.

The reverse side of the insert 12 is provided with a series of numerals 23 disposed in a transverse row and indicative of different centuries. The numerals 23, however, are disposed up-side-down relative to the numerals on the front face of the insert 12.

The envelope 11 has a window or elongated opening 24 extending lengthwise thereof and of such length that portions of all groups of numerals 22 are visible therethrough. The width of said window is such that any seven successive columns of the numerals 21a on the front face of said insert are visible through said window for producing a calendar for a year. Along the upper edge of said window is a row of indicia 25 on the front wall 13, for the days of the week, and along the lower edge of said window is a row of indicia 26 for the week days, but with the days advanced for leap years. Along the left hand edge of said window is a row of indicia 27 for the different months. An indicia 28 may be disposed on the front wall 13 to coact with one of a series of numerals 29 on the insert, as through a window 30 for indicating the current year or a year near thereto.

On the rear wall 14 of the envelope is placed a table such as 31 having different numerals arranged in a series of vertical columns 32 that may be seven in number. Adjacent to said columns, a transverse opening 33 may be provided in the wall 14, so that the insert may be moved to cause any indicia 23 to register with a desired column 32 for obtaining a required year. It will be noted that the table 31 and opening 33 register in location with the window 24. Like the numerals 23, the table 31 is arranged up-side-down relative to the indicia on the front wall 13 of the envelope. There are sufficient numerals in each row 32 to obtain the years for a century. Certain of the numerals such as 34 are emphasized or otherwise differentiated from the others for indicating leap years. The reason for repeating some of the numerals such as 17 and 18 is to enable these numerals to aline with any desired column 32, despite the limited space available for movement of the insert. It may be noted that the years 1600 and 2000 are leap years against the general rule, and hence the year 2000, for example, is obtained by setting the insert 12 so that the numeral 19 of the row 23 coincides with the column having the year 2000 at 35, in the last column of the table.

The manner of operating the device will now be described. Assuming that the calendar for 1932 is desired, a numeral 19 of the row 23 on the back of the envelope is brought into registry with that column 32 which contains the numeral 32, by moving the insert 12 relative to the envelope 11. The heavy shading of numeral 32 indicates that 1932 is a leap year. At the same time 1932 is indicated at the front of the envelope at 28, 30. For leap years, the months of January and February are taken in connection with the indicia for common years 25, and as indicated by indicia 36; the months from March to December inclusive are taken in connection with the indicia 26 for leap years. If the calendar for the year 1701 be desired, the insert is moved until the numeral 17 of the row 23 registers with a column 32 having indicia 01, the latter showing that this is not a leap year. Then the front side of the device shows the calendar for 1701, all months being taken in connection with the indicia 25. The calendar with the particular indicia shown repeats for years in excess of 2000, so that for year 2035, for example, the device may be set for 1635.

All blank spaces on the front and back of the envelope may be used for advertising matter, or data of general utility. All windows may be enclosed as by a transparent material to safeguard the insert.

I claim:

1. A perpetual calendar including a plurality of interrelatively movable members, one of said members having on one side thereof a table of numbers in rows and columns for the months of different years, so that any portion of said table including seven of said numbers in a row shall afford the numbers for the months of a desired year, said member having indicia on its reverse side, and the second member having indicia which can be coordinated with said indicia on the first member by movement of the members relative to each other, so that a desired year can be obtained by alinement of the indicia on the different members, certain of said indicia on the second member being differentiated from others thereof for indicating whether the year obtained is a leap year, the second member having window means for defining a portion of the table on the first member to obtain a calendar corresponding to the year to which the members have been set according to said indicia, and the second member having other indicia coordinated with the columns of said tables to indicate the names of the days for common and leap years corresponding to the numbers of said table, certain of the last mentioned indicia being adapted for use with January and February of a leap year and with all months of a common year, and others of the last mentioned indicia being adapted for use with the last ten months of a leap year.

2. A perpetual calendar including an envelope, an insert in the envelope slidable therealong with the latter and the insert coordinated to maintain a parallel relation, the envelope having a window in the front wall thereof, the insert having a table of numbers in rows and columns so arranged that by sliding the insert, the window defines a portion of said table with numbers for the days of the months of a year, the front wall of the envelope having at the ends of said window indicia for the names of the days, the indicia at one end being for a common year and those at the other end being for a leap year, and said front wall having along one side of said window indicia for the names of the months, the back wall of said envelope having a table for different years and a window adjacent to said table, said insert having on its rear face indicia for the centuries adapted to be brought into registry with different year indicia of said table by movement of the insert, said century and year indicia being so coordinated with the day and month table on the insert and the front window of the envelope as to obtain the calendar for a corresponding year, and certain of the year indicia being arranged to denote leap years.

3. A perpetual calendar having a member, and an element slidable therealong, said element having on its front face a table of numbers arranged in vertical groups and in rows and columns, and the member having a window so that different portions of said table are visible through said window by movement of the element to obtain calendars for different years according to the portion of the table exposed, and said member having indicia adjacent to said window for the names of the days and months coordinated with said table, the groups of members being so arranged that the first numeral for March falls in the same vertical column as the numeral twenty nine for February, and the indicia for the days on said member being arranged in two groups, one of which is for common and the other for leap years.

4. A perpetual calendar including a plurality of interrelatively movable members, one of said members having a table of numbers in rows and columns, the other member having a window for exposing a portion of said table, said numbers being arranged in groups for months so that calendars for different years are obtained by means of different portions of said table exposed through said window, one of said members having a different table for year numerals and the other member having century indicia adapted to be coordinated with any desired year numeral by relative setting movement as between said members and with the exposure of a calendar by said window corresponding to the year obtained by the setting movement, the numbers of the first mentioned table being arranged so that the first numeral for March falls in the column for the twenty ninth numeral of February, and the member having the window being provided with a plurality of sets of indicia to be coordinated with the columns of numerals, one set of indicia being arranged for indicating the days of common and the other the days of leap years.

5. A perpetual calendar including a plurality of interrelatively movable members, one of said members having a window means, the other member having numerals arranged in rows and columns, a portion of said table being exposed by said window means, said numerals being arranged in groups for months and so coordinated with the window means that calendars for different years are obtained, groups of numbers being arranged so that the first numeral for March falls in the same column as numeral twenty nine for February, and the member having the window means having two sets of indicia in rows and columns for the names of the days of the week, one set of said indicia beginning with one day of the week and the other set with a successive day of the week and being in the same column therewith, said indicia being adapted to register with the columns of said table, and one set of said indicia being indicative of days for common years and of those for January and February of leap years, and the other set of indicia being indicative of days for March to December for leap years.

6. A perpetual calendar including a plurality of interrelatively movable members, one of said members having a window means, the other member having numerals arranged in rows and columns, a portion of said table being exposed by said window means, said numerals being arranged in groups for months and so coordinated with the window means that calendars for different years are obtained, groups of numbers being arranged so that the first numeral for March falls in the same column as numeral twenty nine for February, and the member having the window means having two sets of indicia in rows and columns for the names of the days of the week, one set of said indicia beginning with one day of the week and the other set with a successive day of the week and being in the same column therewith, said indicia being adapted to register with the columns of said table, and one set of said indicia being indicative of days for common years and of those for January and February of leap years, and the other set of indicia being indicative of days for March to December for leap years, one of said members having century indicia and the other member having a table for years to be coordinated with said century indicia by interrelative movement of the members so that the window means defines a corresponding calendar for said year.

In testimony whereof I affix my signature.

STEPHEN FUREDI.